(12) United States Patent
Kelnhofer

(10) Patent No.: US 6,499,692 B2
(45) Date of Patent: Dec. 31, 2002

(54) SUSPENSION FOR AIR GENERATION UNITS IN AIRCRAFT

(75) Inventor: Juergen Kelnhofer, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/908,481

(22) Filed: Jul. 18, 2001

(65) Prior Publication Data

US 2002/0008176 A1 Jan. 24, 2002

(30) Foreign Application Priority Data

Jul. 18, 2000 (DE) .......................................... 100 35 301

(51) Int. Cl.$^7$ ................................................ B64C 1/22
(52) U.S. Cl. ................................ 244/117 R; 244/118.5; 248/343
(58) Field of Search .......................... 244/118.5, 117 R; 248/343, 220.21, 220.22, 674, 675, 317, 320, 318; 62/263, DIG. 16

(56) References Cited

U.S. PATENT DOCUMENTS

| | | | | |
|---|---|---|---|---|
| 4,702,087 A | * | 10/1987 | Nakajima et al. | 62/285 |
| 4,815,396 A | * | 3/1989 | Gehring | 108/149 |
| 4,862,764 A | * | 9/1989 | Gehring | 108/149 |
| 5,039,902 A | * | 8/1991 | Schwarz | 206/806 |
| 5,351,926 A | * | 10/1994 | Moses | 248/343 |
| 6,318,672 B1 | * | 11/2001 | Traylor | 244/118.5 |

* cited by examiner

Primary Examiner—Peter M. Poon
Assistant Examiner—Timothy D. Collins
(74) Attorney, Agent, or Firm—W. F. Fasse; W. G. Fasse

(57) ABSTRACT

A suspension arrangement for suspending an air conditioning system from an aircraft airframe structure includes a first suspension unit including plural individual suspension rods, and a second suspension unit including a base frame supported from vertical carrier members. Upper ends of the carrier members are secured to load-carrying suspension points of the airframe structure. Upper ends of the suspension rods are secured to load-introduction points on the base frame. Bottom ends of the suspension rods are secured to suspension points on the components of the air conditioning system. The frame provides a greater number and variety of suspension locations to accommodate a greater number of suspension rods for suspending the air conditioning system, with a smaller number of vertical carrier members being secured to corresponding suspension points on the airframe structure. An intermediate mounting support arrangement may further be provided between the suspension rods and the suspension frame.

25 Claims, 8 Drawing Sheets

SUSPENSION FOR AIR GENERATION UNITS IN AIRCRAFT

PRIORITY CLAIM

This application is based on and claims the priority under 35 U.S.C. §119 of German Patent Application 100 35 301.0, filed on Jul. 18, 2000, the entire disclosure of which is incorporated herein by reference.

FIELD OF THE INVENTION

The invention relates to a suspension arrangement for supporting an air conditioning system or a so-called air generation unit within the fuselage of an aircraft, and especially a high capacity commercial passenger transport aircraft.

BACKGROUND INFORMATION

There are various arrangements known in the art for supporting air conditioning systems, i.e. so-called air conditioning packs or air generation units, in the fuselage of an aircraft. Especially in high capacity passenger aircraft, of which the fuselage interior space is divided into an upper deck and a lower deck, it is known to support an air conditioning system on the aircraft structure, mainly in either one of two technologically different manners or concepts. The first concept, which applies especially to aircraft with an integrated air-supported air conditioning system, involves suspending the air conditioning system from the aircraft fuselage ceiling structure using suspension rods. The second concept involves supporting the air conditioning system standing on the cabin or freight compartment floor.

In the first concept of suspending the air conditioning system using suspension rods, the first step is to define the necessary force introduction points statically on each one of the various components of the air conditioning system and similarly also on the aircraft airframe structure in order to achieve the required weight-bearing suspension support as well as the necessary degree of safety. Namely, the suspension arrangement must be strong and secure enough, and provide a sufficient safety margin, to comply with applicable aviation regulations, which are especially stringent for overhead suspended installations. So-called suspension rods are used as the connection and force bearing elements. These rods must be specially designed and fabricated with a high precision tolerance to the specific required installation length for each suspension point, even though the rods allow a small degree of length adjustment.

In order to install this suspension arrangement in the aircraft, all of the rods are first individually pre-mounted on the defined force introduction points or load-bearing points on the aircraft airframe structure, and then the various individual air conditioning components or devices of the air conditioning system are installed and suspended on the bottom ends of the suspension rods. In this regard, the various suspension rods must be individually adjusted. In order to accommodate different patterns of the load-introduction points on the air conditioning system in comparison to the load-introduction points on the aircraft airframe structure, the individual suspension rods are arranged at various angles and with various lengths, resulting in a rather complicated and time consuming installation process.

Nonetheless, such a suspension arrangement, which is used, for example, in the known Airbus A319, A320, A321, A330 and A340 aircraft, is a very advantageous manner of installing and supporting the air conditioning system. Namely, during the installation, this suspension arrangement provides a high degree of flexibility, because essentially every load-bearing structure of the aircraft airframe can be utilized as a possible suspension point for a respective component of the air conditioning system. It is also possible to install the air conditioning system in the area enclosed within the belly fairing, namely outside of the main pressurized aircraft fuselage, whereby the air conditioning system is supported below the aircraft airframe structure, without using up any of the available space or volume within the aircraft structure itself.

The above mentioned second concept for supporting an air conditioning system is used, for example, in the known Airbus A300 and A310 aircraft, and involves mounting and securing the air conditioning system on a corresponding statically determined loadable area of a floor within the aircraft structure. While this installation concept is simpler than the above described first concept using suspension rods, this second concept also suffers certain disadvantages. Foremost, this installation requires a direct mechanical connection of the air conditioning system onto a strong, rigid, load-bearing floor structure within the aircraft fuselage itself. This, of course, limits the flexibility of the Id location at which the air conditioning system can be installed, and also necessarily reduces or encroaches on the available cabin volume and freight compartment volume that is available within the aircraft fuselage. Any attempt to install an air conditioning system in this manner in any area other than a pre-existing load-supporting floor of the aircraft structure would carry with it severe weight penalties, because it would be necessary to build an additional load-bearing floor area.

Neither of the two above described conventional air conditioning system installation and support concepts are well suited to installing an air conditioning system in the high capacity multi-deck passenger transport aircraft now under development, whereby it is desired to install the air generation units (AGUs) in extremely high areas within the aircraft fuselage structure and/or at locations that will only partially reduce the available cabin or freight volume available within the aircraft fuselage. Particularly, it is desired to install the air generation units at locations where the remaining volume within the fuselage above or below the respective air conditioning system will still be usable, for example as passenger cabin space or freight and cargo hold space. It is also important that the installation does not significantly add to the weight of the overall aircraft, and is simple and economical to carry out.

SUMMARY OF THE INVENTION

In view of the above, it is an object of the invention to provide a suspension arrangement for supporting an air conditioning system or so-called air generation unit (AGU) in a high capacity commercial transport aircraft in a manner that is simple and economical to install, comparatively light in weight, and high in load supporting strength and crash worthiness or safety in an accident situation. It is a further object of the invention to provide such a suspension arrangement for suspending an air generation unit in an extremely high and difficult to access installation space in the lower aircraft fuselage area. Moreover, the installation shall be such that the remaining volume above or below the air conditioning system shall still be usable as passenger space, cargo and freight space, or storage space. The invention further aims to avoid or overcome the disadvantages of the prior art, and to achieve additional advantages, as apparent from the present specification.

The above objects have been achieved according to the invention in a suspension arrangement for suspending an air conditioning system (or other system unit) in an aircraft. The suspension arrangement includes distinct first and second securing units or suspension mounting units. The first suspension mounting unit comprises plural suspension rods that are each secured at their bottom end to a respective component of the air conditioning system and extend vertically or substantially vertically upwardly from the air conditioning system. The second suspension mounting unit comprises a suspension frame that is secured to defined force introduction and support locations on the aircraft airframe structure below or within the outer enclosure of the aircraft fuselage. The respective upper ends of the suspension rods of the first suspension mounting unit are secured to defined force introduction and support locations on the suspension frame.

By providing these two distinct suspension mounting units with distinct functions, the invention achieves the above described advantages. The installation is very flexible and adaptable, yet simple and economical to carry out. The suspension frame provides a standardized array of load-introduction or suspension points, preferably on a single suspension plane, from which the suspension rods of the other suspension mounting unit may be secured and suspended. Thereby, the suspension frame is flexibly adaptable to different configurations of the aircraft fuselage structure or airframe structure at different locations at which the air conditioning system may be installed. On the other hand, the suspension rods more simply need to be connected only between the specialized load-introduction or suspension points on the various components of the air conditioning system at the respective lower ends of the suspension rods, while the upper ends of the suspension rods can be easily secured to the standardized or pre-established array of suspension points provided on the suspension frame. The array of suspension points on the suspension frame can already be adapted to generally match the locations of the suspension points of the air conditioning system. It is thus no longer necessary for the suspension rods to achieve the accommodation between differing patterns and locations of suspension points on the air conditioning system and on the aircraft air-frame structure respectively.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
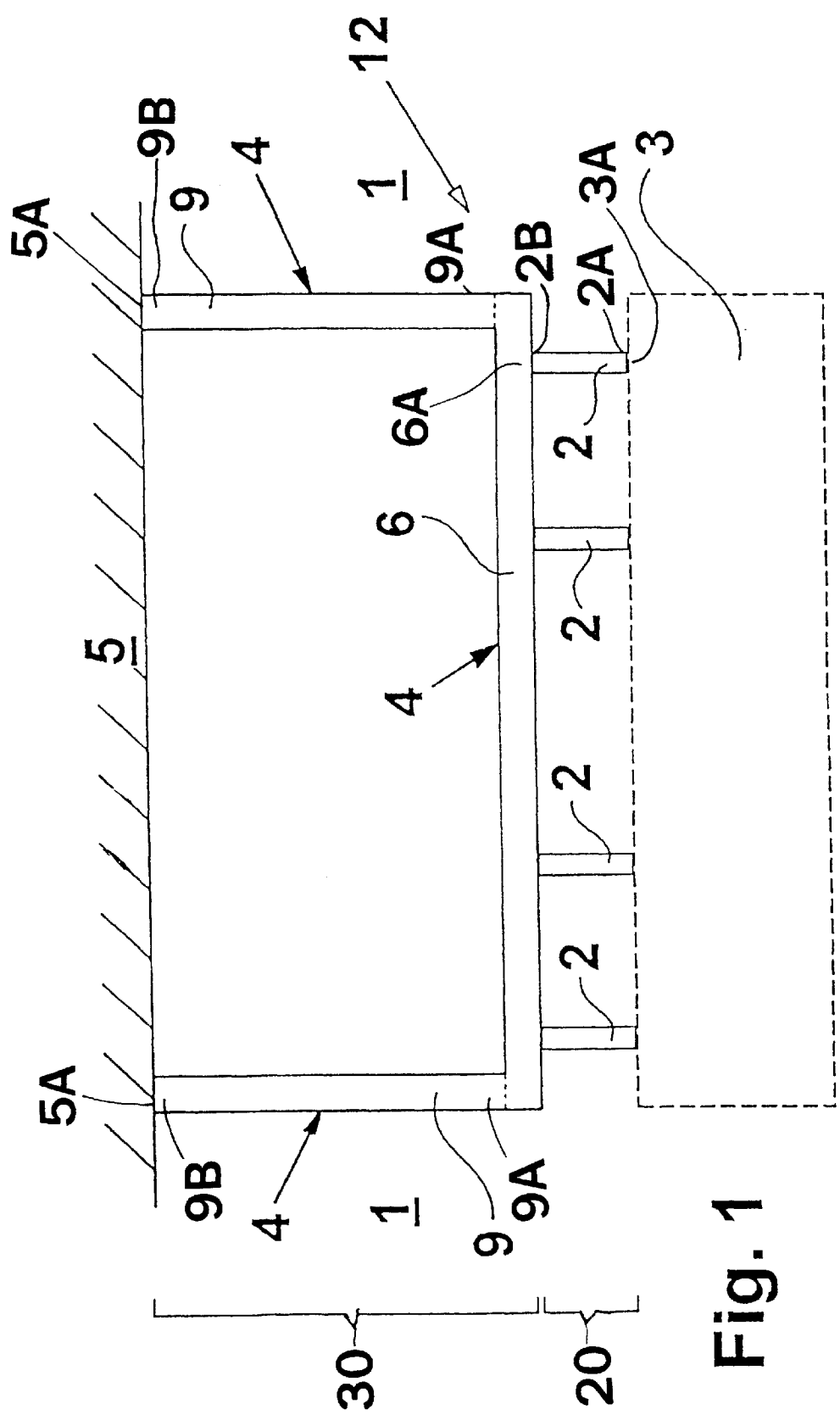
FIG. 1 is a schematic side view of a suspension arrangement according to the invention secured to a horizontal aircraft ceiling structure, and carrying an air conditioning system or air generation unit suspended below the suspension arrangement.

FIG. 1 schematically shows a side view of an air conditioning system suspension arrangement 12 that generally includes two distinct suspension units, namely a first suspension unit 20 and a second suspension unit 30, connected to each other in load-bearing series to suspend an air generation unit or air conditioning system 3 from the aircraft airframe structure 5. The airframe structure 5 includes all structural supporting members of the aircraft, making up the supporting structure of the fuselage, and structural members within the fuselage. The two distinct suspension units 20 and 30 of the inventive suspension arrangement 12 respectively have different structural arrangements of different structural components, when these two suspension units are compared to each other. Also, the air conditioning system 3 is understood to be made up of several components, such as heat exchangers, blowers, fans, turbines, compressors, water separators, valve arrangements, air ducts, and the like, which may be individually supported or connected together into assemblies that are supported as such.

The first suspension unit 20 essentially comprises an arrangement of plural suspension rods 2, which are especially of the same length in this embodiment. Four of such suspension rods 2 are illustrated in the drawing. Each suspension rod 2 has a lower or bottom end 2A connected to a respective load-introduction or suspension point 3A on the air conditioning system 3 (or on individual components thereof as mentioned above), and an upper or top end 2B connected to a respective load-introduction or suspension point 6A on the second suspension unit 30.

The second suspension unit 30 comprises an assembled suspension frame 4, that includes a base frame 6, and a plurality of vertically arranged support or carrier members 9, which are also called differential carriers 9 herein, because they extend between the base frame 6 and the supporting structure of the aircraft airframe 5 and accommodate any differences in the vertical height therebetween. Nonetheless, in the present illustrated embodiment with a flat horizontal ceiling structure of the supporting aircraft airframe structure 5, all of the vertical carrier members 9 have the same length. Two of these carrier members 9 are visible in FIG. 1. Thereby, the vertical carrier members or differential carriers 9 carry the base frame 6 suspended from the supporting aircraft airframe structure 5.

Figure 2:
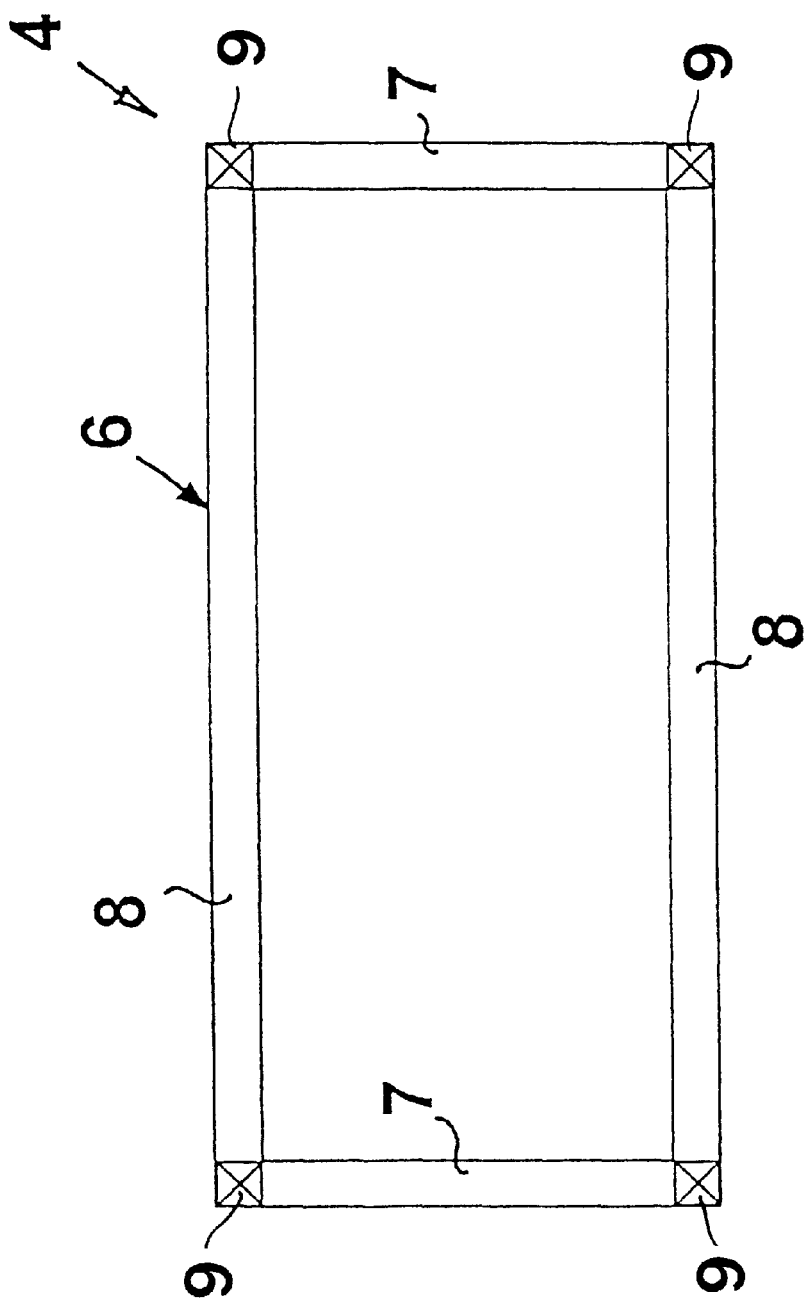
FIG. 2 is a top view of the suspension frame of the suspension arrangement shown in FIG. 1.

The rectangular construction of the base frame 6 is clearly shown in the schematic top view of FIG. 2. In this embodiment, the base frame 6 comprises two longitudinal beams 8 respectively of the same length, and two crosswise beams or crossbeams 7 respectively of the same length, whereby these four beams are interconnected at the corners of the rectangular frame 6 by any known mechanical fastening means, such as welding, bolts, screws, securing pins, rivets, or lock-together plug-in connections. Any of such connection means are similarly applicable for any of the connections of the various components of the suspension arrangement to each other, to the air conditioning system, and to the airframe structure.

In the present embodiment, one end of one respective longitudinal beam 8 and one end of one respective crossbeam 7 are secured to each other at each one of these frame corner points. In alternative embodiments, it is further possible to provide additional crossbeams and/or longitudinal beams to provide the required strength, span lengths, and/or number or location of suspension points. It is further possible to provide diagonal bracing struts in the manner of a truss structure to provide additional strengthening if necessary. Instead of the rectangular configuration, the base frame 6 could alternatively have a square, triangular, or complex polygon shape to best match the mounting needs at hand.

Now referring again to FIG. 1, the lower or bottom ends 9A of the respective vertical carrier members 9 are secured to the base frame 6, and these vertical carrier members 9 extend substantially vertically, whereby the upper or top ends 9B of the vertical carrier members 9 are respectively secured to defined or statically determined force introduction and force transmission points or suspension locations 5A on the supporting aircraft airframe structure 5 above the base frame 6. These secure connections are carried out in any known mechanical manner, such as by welding, riveting, bolting, screwing, pinning, or the like.

In this example embodiment, the lower ends 9A of the vertical carrier members 9 are secured directly to the corner areas of the base frame 6. That is not strictly required, however. It would further be possible to arrange diagonal carrier members in the manner of a truss, to provide additional rigidity for the second suspension unit against swaying or bending. In any event, the illustrated construction provides a definitively fixed suspension of the suspension frame 4 hanging downwardly from the supporting aircraft airframe structure 5.

Figure 6:
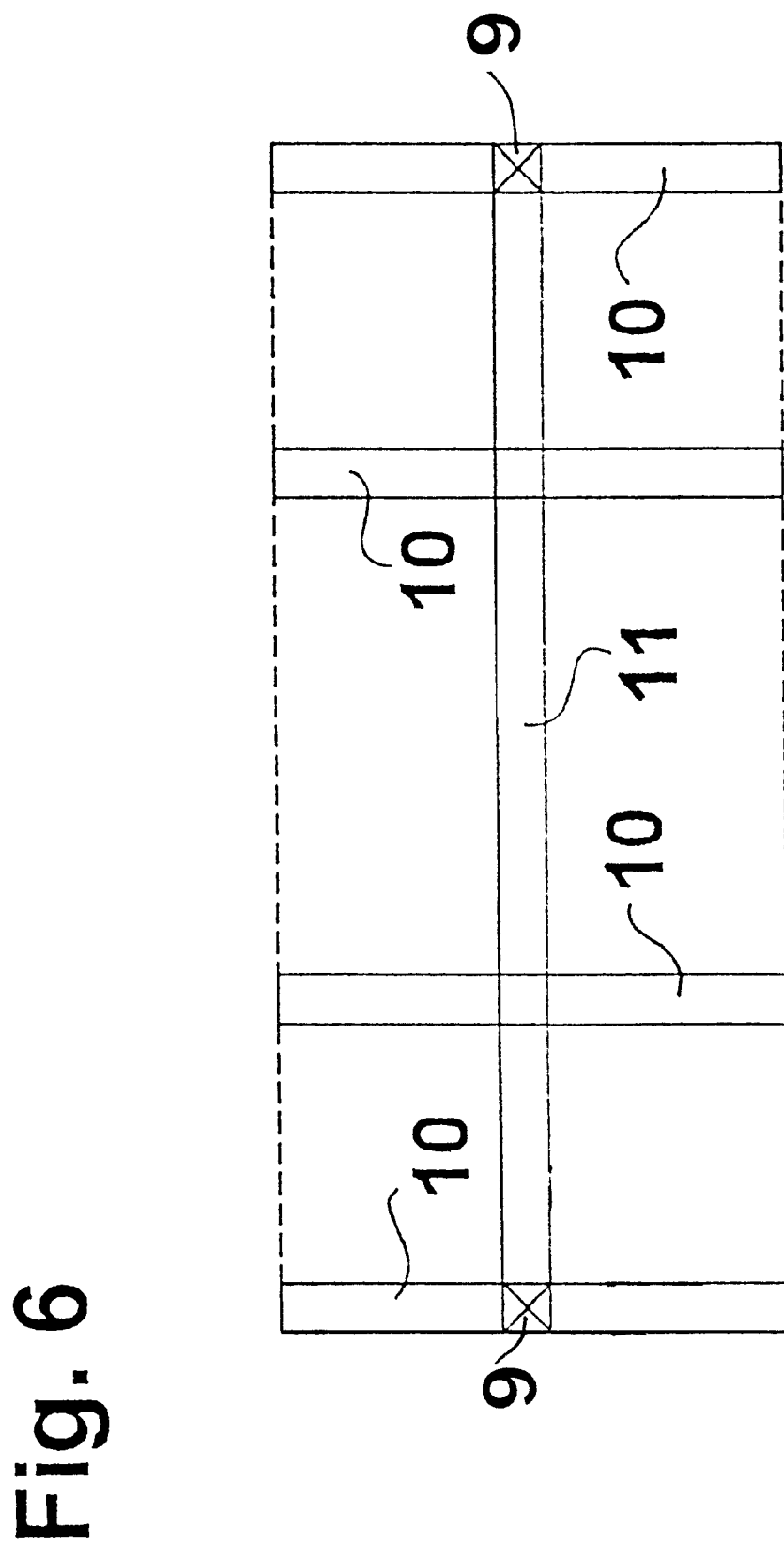
FIG. 6 is a schematic top view of the modified suspension including crosswise and longitudinal mounting support members in the suspension arrangement of FIG. 5.

In many typical cases, the air conditioning system 3 is installed in the lower deck, and particularly in the freight and cargo hold area of the aircraft. Thus, the present example can be understood as relating to the supporting aircraft airframe structure representing the ceiling structure of the lower cabin or the freight and cargo hold compartment. Namely, in this example, the base frame 6 is suspended by the vertical carrier members 9 from the metal supporting structure of the cabin deck that provides the floor of the passenger cabin as well as the ceiling of the cargo hold therebelow. In the embodiment of FIG. 6, in which the base frame 6 and the overall suspension frame 4 are embodied as a simple frame, at least two vertical carrier members 9 will be necessary.

As mentioned above, the first suspension unit 20 includes a plurality of the suspension rods 2, of which the upper ends 2B are connected to corresponding determined load-introduction or suspension points 6A on the base frame 6, and the lower ends 2A are connected to corresponding determined load-introduction or suspension points 3A on the components of the air conditioning system 3. In the illustrated embodiment, the suspension rods 2 all extend vertically or substantially vertically (e.g. within±10° of vertical, when the aircraft fuselage is understood to be oriented with its longitudinal axis horizontal) and correspondingly perpendicularly or substantially perpendicularly relative to the base frame 6.

It should be understood, for all embodiments herein, that the vertical carrier members 9 as well as the suspension rods 2 could alternatively be arranged other than vertically or substantially vertically, i.e. at any required angle relative to vertical, or relative to the base frame 6, to satisfy the particular installation requirements. As also mentioned above, it is further possible to provide a combination of vertical members as well as diagonal or sloping members in a truss arrangement.

In the simple embodiment of FIG. 1, it is also evident that the suspension rods 2 all have the same rather short length, and all of the vertical carrier members 9 all respectively have the same vertical length. The length of the vertical members 2 and 9 can be selected as required to achieve the required or desired installation level of the air conditioning system 3, for example to facilitate the occasionally required maintenance, upkeep, and repair work that must be carried out on the air conditioning system 3. With this suspension arrangement 12, it is thus also suitable for installing an air conditioning system 3 in extremely high installation spaces 1, while the suspension arrangement 12 itself has a rather small height to achieve a space-saving compact arrangement and ensure that the space below the air conditioning system will still be unobstructed and available for use.

Moreover, it should be understood that the suspension frame 4 is designed, statically determined and constructed, and the number and location of the suspension points 6A between the base frame 6 and the suspension rods 2, as well as the number and locations of the vertical carrier members 9 between the base frame 6 and the suspension points 5A of the supporting aircraft airframe structure 5, as well as the means for securing the components to each other, are all determined by the load of the air conditioning system 3 to be suspended, as well as the boundary conditions required by applicable flight safety regulations.

Figure 3:
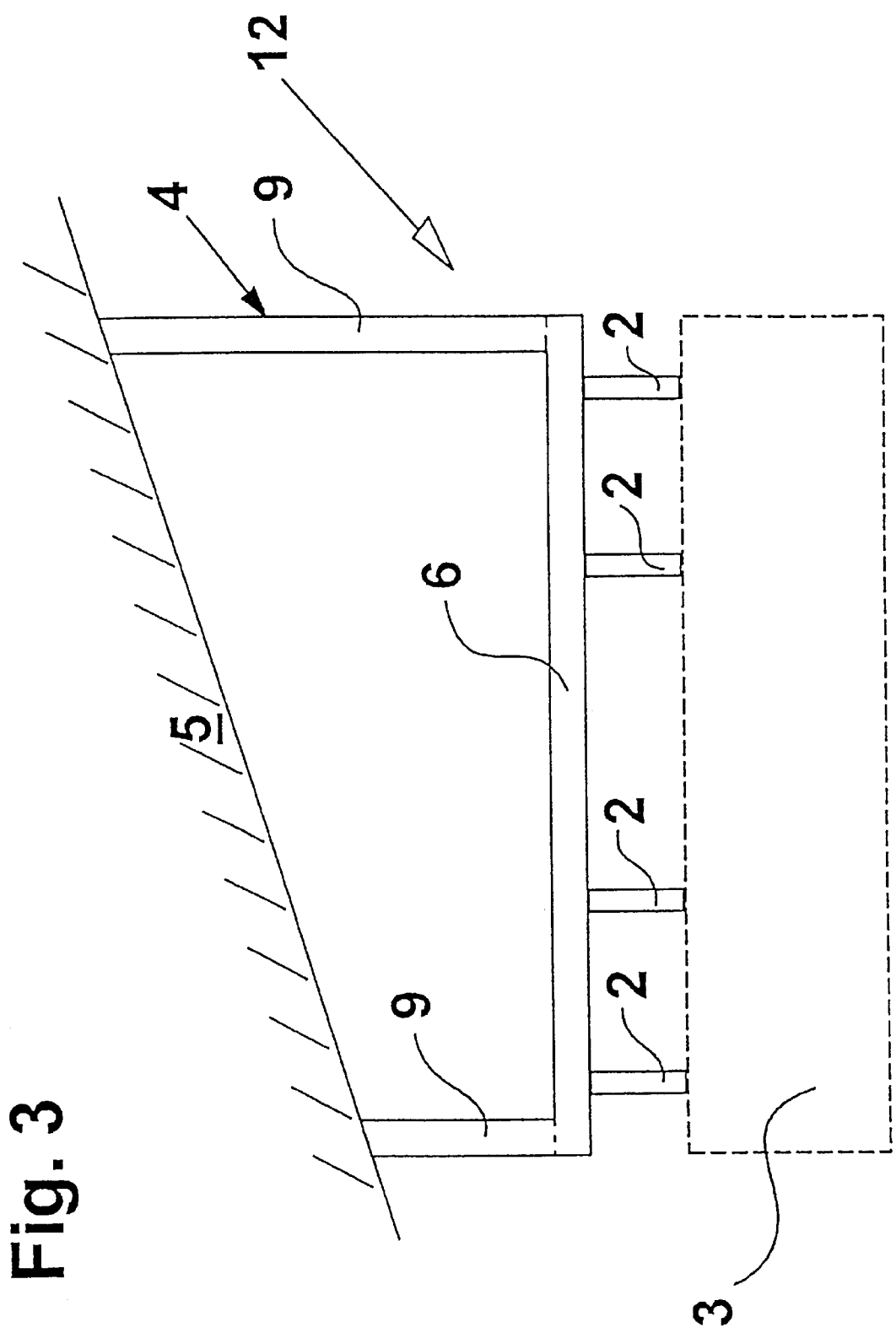
FIG. 3 is a schematic side view of another embodiment of a suspension arrangement according to the invention, generally similar to that of FIG. 1, but adapted to an angled or sloping aircraft ceiling structure.

A further embodiment of the inventive suspension arrangement 12 is shown in FIG. 3. The embodiment of FIG. 3 generally corresponds to that described above in connection with FIGS. 1 and 2, whereby the same reference numbers are used for the same or corresponding components. A redundant description of those corresponding components will not be provided here. The main difference in FIG. 3 as compared to FIG. 1 is that the second suspension unit 30, i.e. the suspension frame 4, is modified to accommodate a sloping aircraft ceiling structure 5. Particularly, the two vertical carrier members 9 visible in FIG. 3 respectively have different lengths, to accommodate the sloping orientation of the aircraft ceiling structure 5, while still holding the base frame 6 on a substantially horizontal plane.

Figure 4:
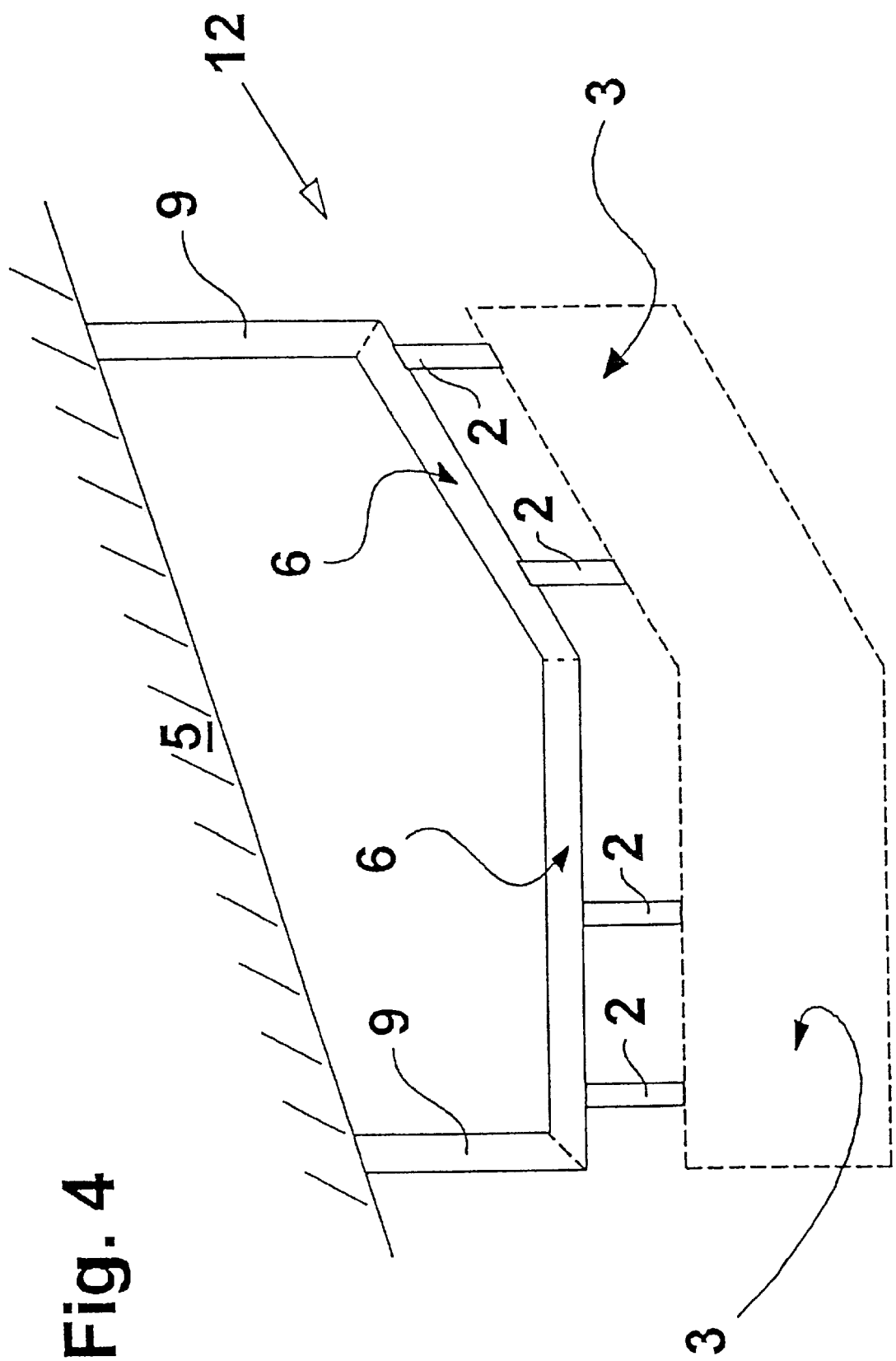
FIG. 4 is a schematic side view of a further varied modification of a suspension arrangement according to the invention, including a suspension frame modified to accommodate a sloping aircraft ceiling structure, and an air conditioning unit that includes an upwardly sloping portion or component.

FIG. 4 illustrates a further modified embodiment of a suspension arrangement 12 which accommodates both a sloping orientation of the aircraft ceiling structure 5, as well as a sloping or complex geometry of the air conditioning system 3 or particular components thereof. In this context, the two illustrated vertical carrier members 9 have different lengths and the base frame 6 includes one portion that is a substantially horizontal frame, and another portion that is a sloping frame corresponding to the slope of a portion of the air conditioning system 3, so that all of the support rods 2 have substantially the same length. Thereby, the geometry of the base frame 6 generally matches the gross geometry of the air conditioning system 3 that is to be supported.

Figure 5:
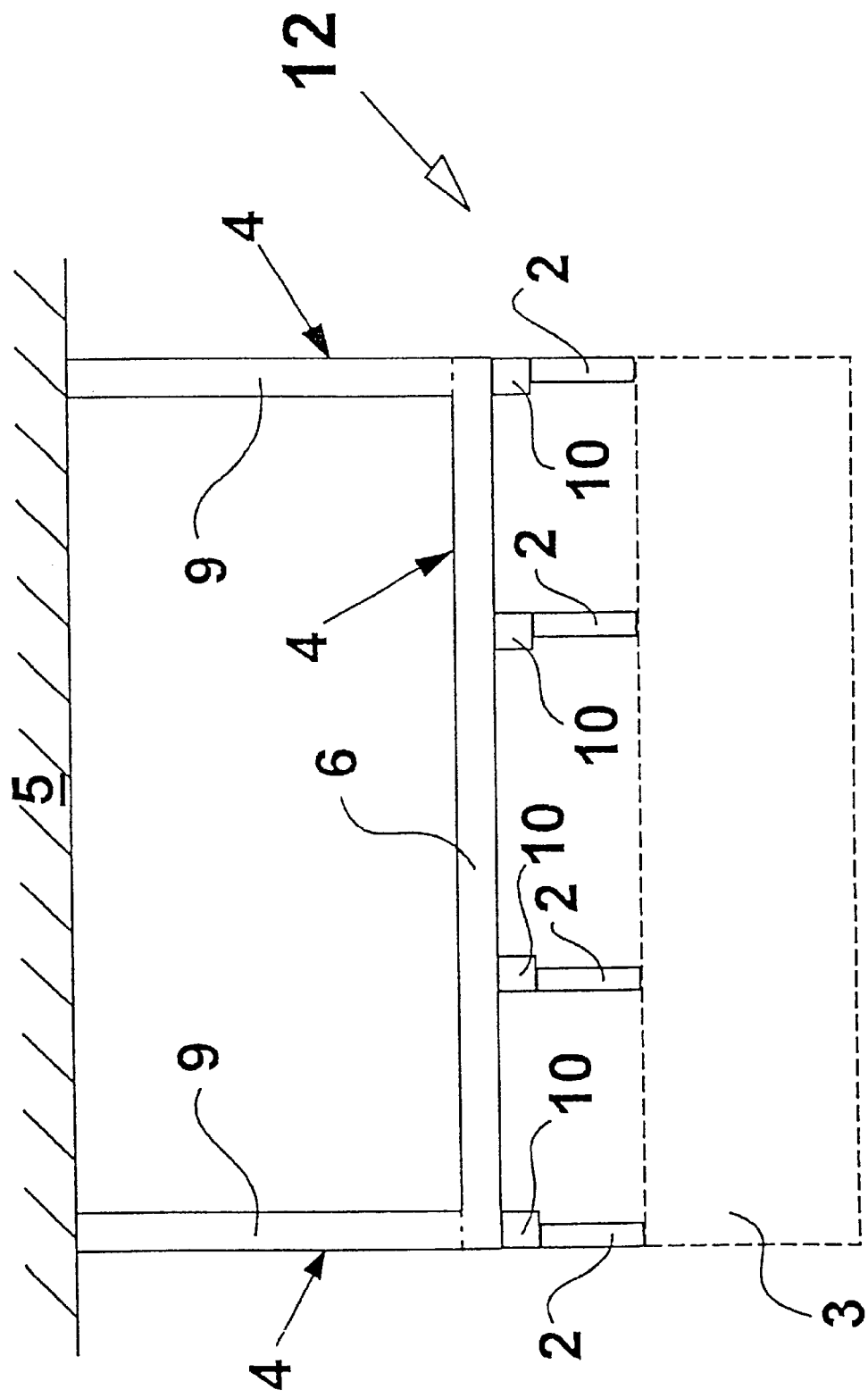
FIG. 5 is a schematic side view of another embodiment of a suspension arrangement according to the invention, generally similar to FIG. 1, but including additional mounting support members according to FIG. 6.

Yet another varied embodiment of the inventive support arrangement 12 is shown in FIG. 5, wherein the suspension frame 4 has been simplified to lie on a single plane, defined by only two vertical carrier members 9, as further evident in FIG. 6. This arrangement could, however, also be used with four vertical carrier members 9 in the same arrangement disclosed above in connection with FIG. 1. In any event, to provide the required number and distribution of suspension points from which the suspension rods 2 may be suspended, an additional mounting support arrangement comprising integrated crosswise mounting supports 10 and a longitudinal mounting support 11 have been arranged directly below the base frame 6, i.e. between the base frame 6 and the suspension rods 2. The structural arrangement and mechanical crossed interconnection of the crosswise and longitudinal mounting supports 10 and 11 is shown particularly in the top view of FIG. 6.

As shown in FIG. 5, the crosswise mounting supports 10 are secured to the bottom of and crossing underneath the base frame 6, and the suspension rods 2, in turn, are suspended downwardly from the crosswise mounting supports 10. The arrangement and securing of the vertical carrier members 9 can be corresponding to the description of FIG. 1 above. This arrangement is particularly advantageous, because it facilitates a pre-mounting or pre-securing of the suspension rods 2 onto the corresponding suspension points of the air conditioning system 3 or the individual components thereof. This pre-mounting of the suspension rods 2 can be carried out even before sliding and/or lifting the air conditioning system 3, with the suspension rods 2 connected thereto, into the final installation space 1. The crosswise and lengthwise mounting supports 10 and 11 have also been preassembled with the suspension rods 2, and serve to hold the suspension rods 2 in the appropriate final configuration and the like. Then, it is a simple matter to secure the crosswise and longitudinal mounting supports 10 and 11 to the base frame 6, once the air conditioning system 3 (together with the suspension rods 2 and mounting supports 10 and 11) has been positioned into the installation space 1.

Figure 7:
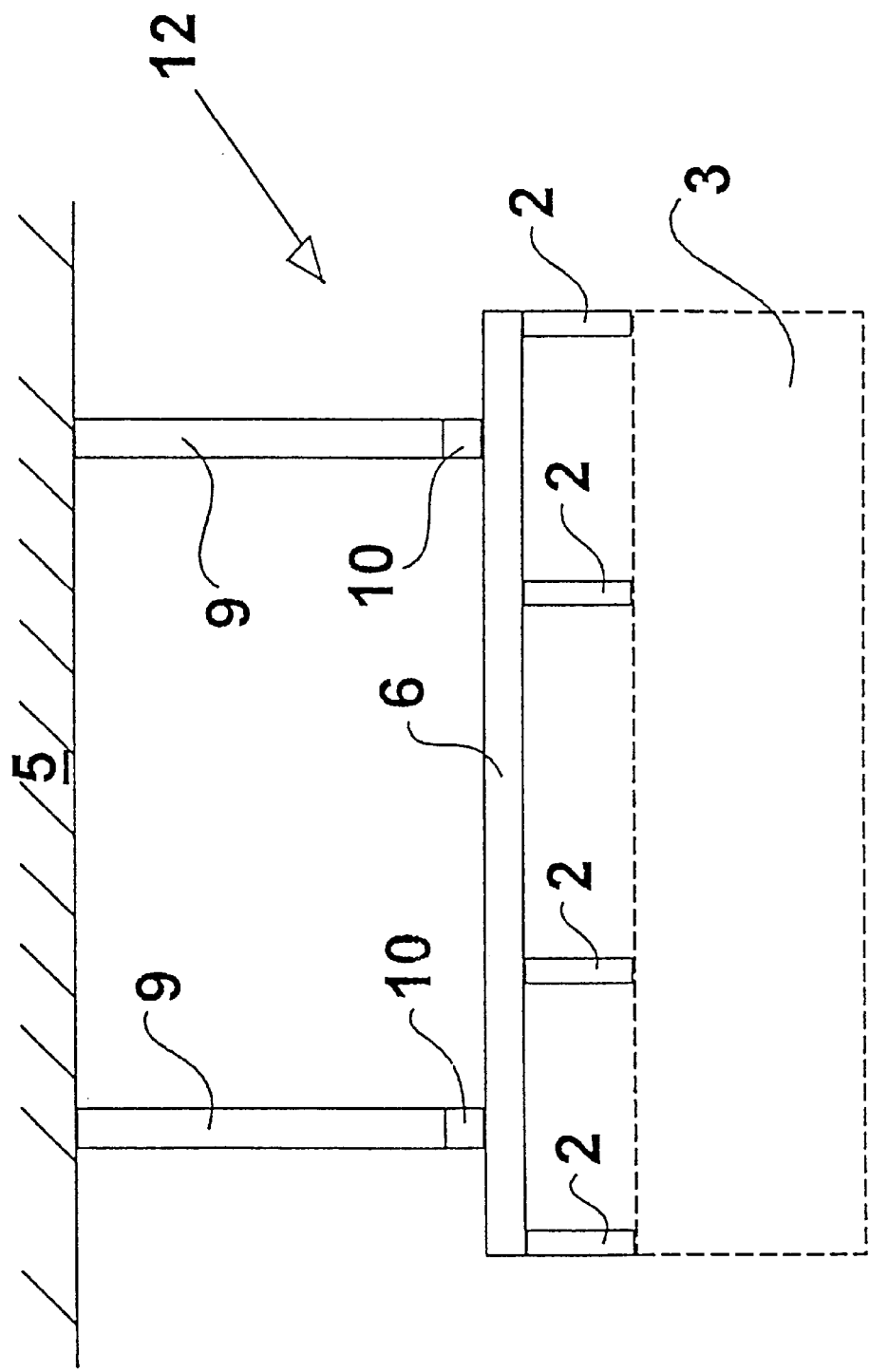
FIG. 7 is a schematic side view of a further modified embodiment of the inventive suspension arrangement, including additional mounting support members according to FIG. 8.
Figure 8:
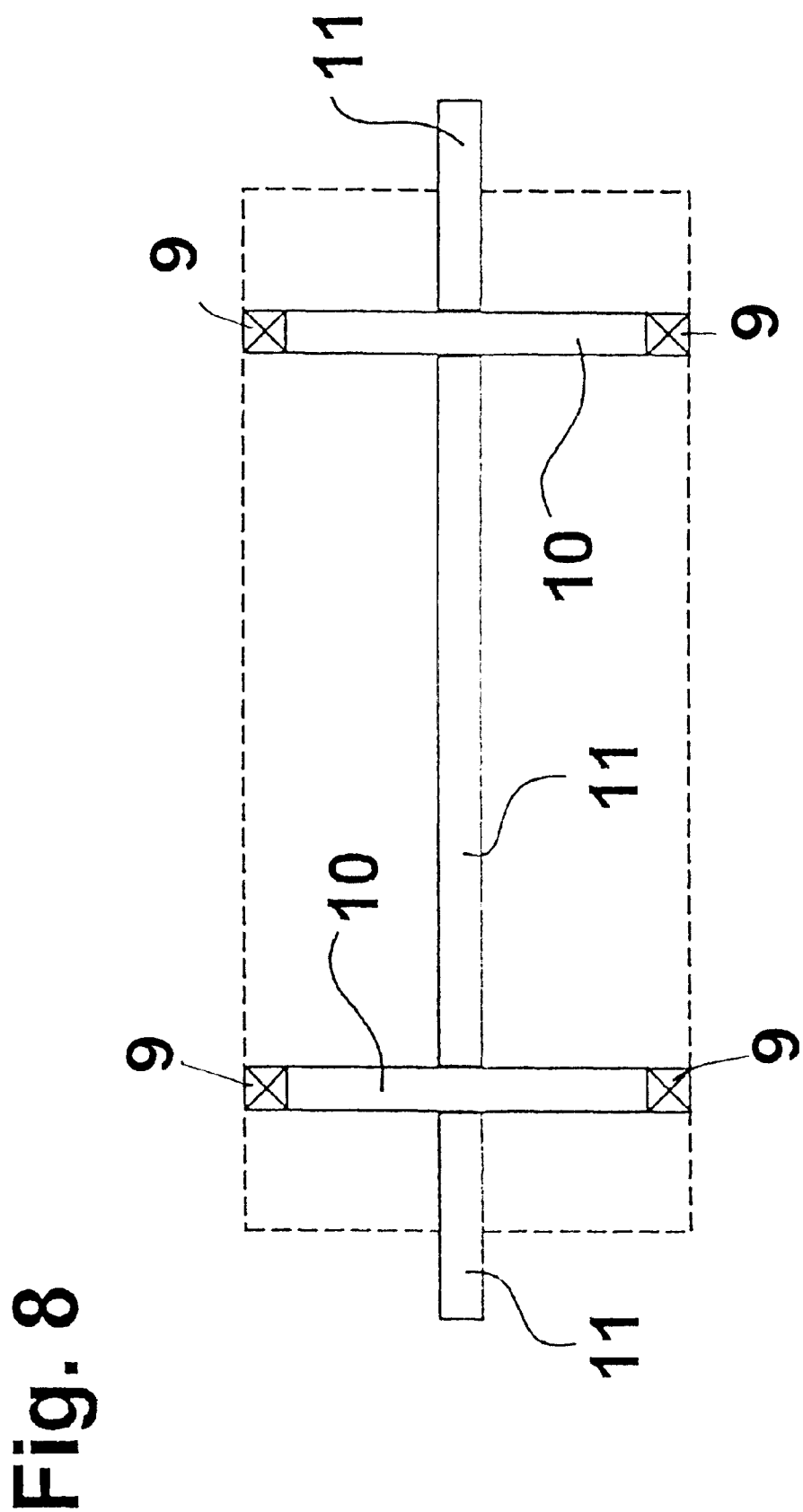
FIG. 8 is a schematic top view of the arrangement of crosswise and longitudinal mounting support members for the suspension arrangement of FIG. 7.

FIG. 7 shows a further modification of the suspension arrangement 12, which uses an additional mounting support construction including crosswise mounting supports 10 and a longitudinal mounting support 11 which are shown in a top view in FIG. 8. These crosswise and longitudinal mounting supports 10 and 11 are generally provided for the same reasons as discussed above in connection with FIGS. 5 and 6, but with a different arrangement than in the embodiment of FIGS. 5 and 6. In the present arrangement, the crosswise mounting supports 10 are secured on top of the base frame 6, while the upper ends of the suspension rods 2 are secured directly to the force introduction and transmission points or suspension locations of the base frame 6. Then, the lower ends of the vertical carrier members 9 are secured to the defined force introduction or suspension points of this additional mounting support arrangement of the mounting supports 10 and 11. Otherwise, the arrangement is similar to arrangements discussed above.

The present inventive suspension arrangement 12 provides many advantages. This suspension arrangement 12 is especially suitable for supporting an air conditioning system 3 in an installation space 1 having an extremely great height, i.e. great spacing distance between the ceiling and the floor structure, as exists, for example, in the lower cabin level, particularly in the freight or cargo hold space of a high capacity passenger transport aircraft. For example, in a future high capacity multi-deck aircraft, the air conditioning system can be suspended by the suspension arrangement at a high location laterally displaced from and above the belly fairing and laterally from and/or just below the wing root junction at which the wing root joins the airframe structure.

By using a suspension frame 4 in combination with the suspension rods 2, the length of the suspension rods 2 can be reduced to a minimum, whereby the absolute elongation of these rods due to temperature variations is reduced. Therefore, the fabrication of these rods is simplified, because the necessary tolerances can be rather large. Also, the criticality of the Eigenfrequency of vibration of the individual suspension rods 2 is reduced. An other advantage is that the installed weight of these suspension rods 2 is thereby reduced, and the work effort required for the overall installation of the air conditioning system 3 is reduced. For example, it is possible to carry out a pre-assembly of the air conditioning system 3, i.e. the various different air conditioning components of the system 3, optionally further in combination with an auxiliary mounting support arrangement, followed by the installation and suspension of the air conditioning system 3 from the suspension frame 4, which itself has been pre-in-stalled in the aircraft.

Moreover, the installation is simplified because a significantly reduced number of connections, at a reduced number of suspension locations, are required on the aircraft supporting structure 5. For example, an installation might require only four suspension points or connection points for connecting the four vertical carrier members 9 of the suspension frame 4, regardless of the much greater number of individual suspension rods 2 that each require their own individual suspension locations. Namely, the base frame 6 provides the interface between a standardized and minimized number of suspension points on the aircraft supporting structure 5 and a greater and variable number and arrangement of suspension points (e.g. for different air conditioning systems) on the air conditioning system or particularly the individual components thereof. The number of the force transmission points between the suspension frame 4 and the aircraft airframe structure 5, as well as the bending stiffness and strength of the individual components of the arrangement, are determined dependent on the load to be carried, as well as the prescribed boundary conditions for flight safety regulations.

Moreover, the suspension frame 4 serves to shift the suspension locations for suspending the suspension rods 2 from the aircraft supporting structure 5, which may be at a rather high and inconvenient location, to a much lower height level, if desired, or any particular height level that provides the appropriately located installation of the air conditioning system 3. Namely, the length of the vertical carrier members 9 is adjusted or selected as necessary to shift the suspension plane from which the suspension rods 2 are suspended, to the required height for any given installation situation.

As a result of the above considerations, the installation effort and complexity are significantly reduced. These same advantages can be achieved by using the present suspension arrangement for suspending other-aircraft systems or devices, for example, for suspending an auxiliary power unit, or an electrical power generation unit, or other system components in the aircraft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including an airframe structure, an air conditioning system unit, and a support arrangement that connects and supports said system unit relative to said airframe structure,
an improvement in said support arrangement comprising a suspension arrangement that comprises:
a suspension frame that is connected to and suspended from said airframe structure at first load introduction suspension points on said airframe structure; and
a plurality of suspension rods that each respectively have upper rod ends connected to and suspended from said suspension frame at second load introduction suspension points on said suspension frame, and lower rod ends connected to said system unit at third load introduction suspension points on said system unit;
wherein said system unit is suspended via said suspension rods and said suspension frame from said airframe structure; and
wherein said aircraft further includes a lowermost deck space with a cargo or luggage hold therein and a passenger deck space above said lowermost deck space, said airframe structure includes a structural deck that forms a ceiling of said lowermost deck space and a floor of said passenger deck space, and said first load introduction suspension points are provided on said structural deck so that said air conditioning system unit is suspended in said lower deck space from said structural deck by said suspension arrangement to be located proximate said ceiling.

2. The improvement in the support arrangement in the aircraft according to claim 1, wherein said air conditioning system unit comprises plural air conditioning system components selected from the group consisting of heat exchangers, blowers, fans, turbines, compressors, water separators, valve arrangements and air ducts, and wherein said third load introduction suspension points are provided respectively separately on said plural components.

3. The improvement in the support arrangement in the aircraft according to claim 1, wherein said suspension rods are each vertical or at least substantially vertical.

4. The improvement in the support arrangement in the aircraft according to claim 1, wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members.

5. In an aircraft including an airframe structure, an air conditioning system unit, and a support arrangement that connects and supports said system unit relative to said airframe structure,
an improvement in said support arrangement comprising a suspension arrangement that comprises:
a suspension frame that is connected to and suspended from said airframe structure at first load introduction suspension points on said airframe structure; and
a plurality of suspension rods that each respectively have upper rod ends connected to and suspended from said suspension frame at second load introduction suspension points on said suspension frame, and lower rod ends connected to said system unit at third load introduction suspension points on said system unit;
wherein said system unit is suspended via said suspension rods and said suspension frame from said airframe structure; and
wherein said aircraft further includes a belly fairing below said airframe structure and a wing root joining said airframe at a wing root junction, and wherein said air conditioning system is suspended by said suspension arrangement at a location laterally displaced from and above said belly fairing and laterally from said wing root junction within said aircraft.

6. In an aircraft including an airframe structure, a system unit selected from the group consisting of an air conditioning system unit, an auxiliary power unit, and an electrical power generation unit, and a support arrangement that connects and supports said system unit relative to said airframe structure,
an improvement in said support arrangement comprising a suspension arrangement that comprises:
a suspension frame that is connected to and suspended from said airframe structure at first load introduction suspension points on said airframe structure;
a plurality of suspension rods that are each vertical or at least substantially vertical and that each respectively have upper rod ends connected to and suspended from said suspension frame at second load introduction suspension points on said suspension frame, and lower rod ends connected to said system unit at third load introduction suspension points on said system unit; and
bracing rods that are not substantially vertical and that are secured between said system unit and said suspension frame;
wherein said system unit is suspended via said suspension rods and said suspension frame from said airframe structure.

7. The improvement in the support arrangement in the aircraft according to claim 6, wherein said system unit is said air conditioning system unit, wherein said air conditioning system unit comprises plural air conditioning system components selected from the group consisting of heat exchangers, blowers, fans, turbines, compressors, water separators, valve arrangements and air ducts, and wherein said third load introduction suspension points are provided respectively separately on said plural components.

8. The improvement in the support arrangement in the aircraft according to claim 6, wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members.

9. In an aircraft including an airframe structure, a system unit selected from the group consisting of an air conditioning system unit, an auxiliary power unit, and an electrical power generation unit, and a support arrangement that connects and supports said system unit relative to said airframe structure,
an improvement in said support arrangement comprising a suspension arrangement that comprises:
a suspension frame that is connected to and suspended from said airframe structure at first load introduction suspension points on said airframe structure; and
a plurality of suspension rods that each respectively have upper rod ends connected to and suspended from said suspension frame at second load introduction suspension points on said suspension frame, and lower rod ends connected to said system unit at third load introduction suspension points on said system unit;
wherein said system unit is suspended via said suspension rods and said suspension frame from said airframe structure;

wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members; and wherein said airframe structure includes a metal ceiling structure above a cabin or a luggage or cargo hold, and said first load introduction suspension points are provided on said metal ceiling structure, so that said system unit is suspended from said metal ceiling structure via said suspension rods, said base frame, and said carrier members.

10. The improvement in the support arrangement in the aircraft according to claim 9, wherein said base frame includes a single frame beam, which is connected to and supported by at least two of said carrier members.

11. The improvement in the support arrangement in the aircraft according to claim 9, wherein said base frame includes two cross beams and two longitudinal beams connected together to form said base frame having a square or rectangular frame configuration, and said base frame is connected to and supported by at least four of said carrier members.

12. The improvement in the support arrangement in the aircraft according to claim 9, wherein said base frame includes three frame beams connected together to form said base frame having a triangular frame configuration, and said base frame is connected to and supported by at least three of said carrier members.

13. The improvement in the support arrangement in the aircraft according to claim 9, wherein said base frame extends along a single flat plane.

14. The improvement in the support arrangement in the aircraft according to claim 9, wherein said base frame is a complex frame including a first frame portion extending along a first plane and a second frame portion extending along a second plane that intersects said first plane.

15. The improvement in the support arrangement in the aircraft according to claim 14, wherein one of said planes is at least substantially horizontal.

16. The improvement in the support arrangement in the aircraft according to claim 9, wherein said suspension rods each extend vertically or substantially vertically and each have the same length.

17. The improvement in the support arrangement in the aircraft according to claim 9, wherein said carrier members each have the same length.

18. The improvement in the support arrangement in the aircraft according to claim 9, wherein said second load introduction suspension points are provided on said base frame, and said carrier members are connected directly to said base frame.

19. The improvement in the support arrangement in the aircraft according to claim 9, wherein said suspension frame is specially dimensioned and configured, the number of said first load introduction suspension points on said airframe structure is selected, and the bending strength of said carrier members and of said suspension rods respectively is defined, so as to suspend a total load of said system unit multiplied by a required safety factor.

20. In an aircraft including an airframe structure, a system unit selected from the group consisting of an air conditioning system unit, an auxiliary power unit, and an electrical power generation unit, and a support arrangement that connects and supports said system unit relative to said airframe structure, an improvement in said support arrangement comprising a suspension arrangement that comprises:

a suspension frame that is connected to and suspended from said airframe structure at first load introduction suspension points on said airframe structure; and a plurality of suspension rods that each respectively have upper rod ends connected to and suspended from said suspension frame at second load introduction suspension points on said suspension frame, and lower rod ends connected to said system unit at third load introduction suspension points on said system unit;

wherein said system unit is suspended via said suspension rods and said suspension frame from said airframe structure;

wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members;

wherein said base frame extends along a single, flat plane that is at least substantially horizontal; and wherein said first load introduction suspension points on said airframe structure are not lying on a substantially horizontal plane, and said carrier members include carrier members having respective different lengths.

21. In an aircraft including an airframe structure, a system unit selected from the group consisting of an air conditioning system unit, an auxiliary power unit, and an electrical power generation unit, and a support arrangement that connects and supports said system unit relative to said airframe structure, an improvement in said support arrangement comprising a suspension arrangement that comprises:

a suspension frame that is connected to and suspended from said airframe structure at first load introduction suspension points on said airframe structure, wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members;

truss members that are not substantially vertical and that are connected between said airframe structure and said base frame; and a plurality of suspension rods that each respectively have upper rod ends connected to and suspended from said suspension frame at second load introduction suspension points on said suspension frame, and lower rod ends connected to said system unit at third load introduction suspension points on said system unit;

wherein said system unit is suspended via said suspension rods and said suspension frame from said airframe structure.

22. In an aircraft including an airframe structure, a system unit selected from the group consisting of an air conditioning system unit, an auxiliary power unit, and an electrical power generation unit, and a support arrangement that connects and supports said system unit relative to said airframe structure, an improvement in said support arrangement comprising a suspension arrangement that comprises:

a suspension frame that is connected to and suspended from said airframe structure at first load introduction suspension points on said airframe structure; and a plurality of suspension rods that each respectively have upper rod ends connected to and suspended from said suspension frame at second load introduction suspension points on said suspension frame, and lower rod ends connected to said system unit at third load introduction suspension points on said system unit;

wherein said system unit is suspended via said suspension rods and said suspension frame from said airframe structure;

said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members; and wherein the number of said second load introduction suspension points on said suspension frame is greater than the number of said first load introduction suspension points on said airframe structure.

23. The improvement in the support arrangement in the aircraft according to claim 22, wherein said second load introduction suspension points are provided on said base frame, and said carrier members are connected directly to said base frame.

24. In an aircraft including an airframe structure, a system unit selected from the group consisting of an air conditioning system unit, an auxiliary power unit, and an electrical power generation unit, and a support arrangement that connects and supports said system unit relative to said airframe structure, an improvement in said support arrangement comprising a suspension arrangement that comprises:

a suspension frame that is connected to and suspended from said airframe structure at first load introduction suspension points on said airframe structure; and a plurality of suspension rods that each respectively have upper rod ends connected to and suspended from said suspension frame at second load introduction suspension points on said suspension frame, and lower rod ends connected to said system unit at third load introduction suspension points on said system unit;

wherein said system unit is suspended via said suspension rods and said suspension frame from said airframe structure;

wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members; and wherein said suspension frame further comprises crosswise and longitudinal mounting support members arranged below and connected to said base frame, said carrier members are connected directly to said base frame, and said second load introduction suspension points are provided on at least one of said mounting support members.

25. In an aircraft including an airframe structure, a system unit selected from the group consisting of an air conditioning system unit, an auxiliary power unit, and an electrical power generation unit, and a support arrangement that connects and supports said system unit relative to said airframe structure, an improvement in said support arrangement comprising a suspension arrangement that comprises:

a suspension frame that is connected to and suspended from said airframe structure at first load introduction suspension points on said airframe structure; and a plurality of suspension rods that each respectively have upper rod ends connected to and suspended from said suspension frame at second load introduction suspension points on said suspension frame, and lower rod ends connected to said system unit at third load introduction suspension points on said system unit;

wherein said system unit is suspended via said suspension rods and said suspension frame from said airframe structure;

wherein said suspension frame comprises a base frame and carrier members that are connected directly or indirectly to said base frame, that extend vertically or substantially vertically upwardly from said base frame, and that are connected to said airframe structure at said first load introduction suspension points, so that said base frame is suspended from said airframe structure via said carrier members; and wherein said suspension frame further comprises crosswise and longitudinal mounting support members arranged above and connected to said base frame, said carrier members are connected to at least one of said mounting support members and therethrough indirectly to said base frame, and said second load introduction suspension points are provided on said base frame.

\* \* \* \* \*